United States Patent
Jax

(10) Patent No.: US 8,503,535 B2
(45) Date of Patent: Aug. 6, 2013

(54) ROUNDING NOISE SHAPING FOR INTEGER TRANSFORM BASED ENCODING AND DECODING

(75) Inventor: Peter Jax, Hannover (DE)

(73) Assignee: Thomson Licensing, Issy les Moulineaux (FR)

(*) Notice: Subject to any disclaimer, the term of this patent is extended or adjusted under 35 U.S.C. 154(b) by 426 days.

(21) Appl. No.: 12/734,625

(22) PCT Filed: Nov. 10, 2008

(86) PCT No.: PCT/EP2008/065189
§ 371 (c)(1), (2), (4) Date: May 13, 2010

(87) PCT Pub. No.: WO2009/065748
PCT Pub. Date: May 28, 2009

(65) Prior Publication Data
US 2010/0309983 A1    Dec. 9, 2010

(30) Foreign Application Priority Data
Nov. 23, 2007 (EP) .................................. 07121440

(51) Int. Cl.
| | |
|---|---|
| H04N 11/02 | (2006.01) |
| H04N 11/04 | (2006.01) |
| H04N 7/12 | (2006.01) |
| H04N 7/32 | (2006.01) |
| G10L 19/00 | (2006.01) |
| G10L 19/02 | (2006.01) |

(52) U.S. Cl.
USPC ............ 375/240.18; 375/240.02; 375/240.03; 375/240.29; 704/203; 704/500

(58) Field of Classification Search
USPC ............ 375/240.02, 240.03, 240.18, 240.29; 704/500, 203
See application file for complete search history.

(56) References Cited

U.S. PATENT DOCUMENTS

| 7,873,227 B2 | 1/2011 | Geiger et al. |
| 2005/0049863 A1* | 3/2005 | Gong et al. .................... 704/233 |

(Continued)

FOREIGN PATENT DOCUMENTS

| JP | 2007508605 A | 4/2007 |
| WO | WO2005033965 | 4/2005 |

OTHER PUBLICATIONS

Westen et al.:"Adaptive Spatial Noise Shaping for DCT Based Image Compression," 1996, Internationl Conference on Acoustics, Speech, and Signal Processing Proceedings, May 7, 1996, pp. 2124-2127.

(Continued)

Primary Examiner — Joseph Ustaris
Assistant Examiner — On S Mung
(74) Attorney, Agent, or Firm — Robert D. Shedd; Jeffrey M. Navon

(57) ABSTRACT

An integer-reversible MDCT transformation is split into consecutive lifting steps, each introducing considerable rounding errors to the signal. Without noise shaping the rounding error noise will impact all frequency bins of the transformed signal equally. This is a particular problem for low signal level frequency bins. The invention limits the impact of rounding error noise coming with each lifting step in the integer-reversible transformation on the data rate of a lossless audio codec. The filter coefficients of an adaptive noise shaping filter for transform coefficients are adapted in individual lifting steps according to the current time domain signal characteristics. As an alternative, an auto-regressive pre-filter can be added in front of the lossless transformation, for raising the level of frequency regions with low power to decrease the dominance of rounding errors in these areas. Both processes can be combined to further improve lossless codec compression ratio.

29 Claims, 11 Drawing Sheets

U.S. PATENT DOCUMENTS

Figure 1:
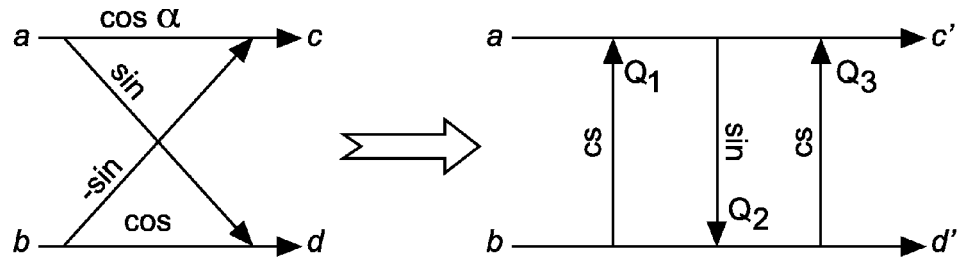

2005/0114126 A1* 5/2005 Geiger et al. .............. 704/230
2006/0210180 A1* 9/2006 Geiger et al. .............. 382/232
2007/0196022 A1  8/2007 Geirger et al.

OTHER PUBLICATIONS

Yokotani et al.:"Lossless Audio Coding using the IntMDCT and rounding Error Shaping," IEEE Transaction on Audio, Speech and Language Processing IEEE USA, vol. 14, No. 6, Nov. 2006, pp. 2201-2211.

Search Report dated Mar. 10, 2009.

Yokotani Yoshikazu et al., Improved lossless audio coding using the nose-shaped IntMDCT, 2004 IEEE 11th Digital signal processing Workshop, Taos Sky Valley, New Mexico, USA.

* cited by examiner

ROUNDING NOISE SHAPING FOR INTEGER TRANSFORM BASED ENCODING AND DECODING

CROSS-REFERENCE TO RELATED APPLICATIONS

This application claims the benefit, under 35 U.S.C. § 365 of International Application PCT/EP2008/065189, filed Nov. 10, 2008, which was published in accordance with PCT Article 21(2) on May 28, 2009 in English and which claims the benefit of European patent application No. 07121440.7, filed Nov. 23, 2007.

FIELD OF INVENTION

The invention relates to a method and to an apparatus for improving the encoding efficiency for an audio or video signal.

BACKGROUND OF THE INVENTION

Integer-reversible transform, in particular the Integer MDCT (IntMDCT), is used in lossless or HD (high definition) audio/video coding. For example, the recently standardised MPEG-4 SLS codec uses an IntMDCT.

The approach may be applicable as well in other fields where lossless transformations are used. E.g., integer-reversible Wavelet transforms are used for lossless image and video coding.

The problem of any integer-reversible transformation is that the transformation is split into consecutive steps, each of which introduces considerable rounding errors to the signal. This problem gets more significant the lower the level of the useful signal to be encoded. Therefore, the rounding error noise is a limiting factor in residual coding schemes, in which the residuum is the error signal between the original (or lossless or HD) signal and the lossy or standard definition coded version of it.

Without noise shaping the rounding error noise will impact all frequency bins of the transformed signal equally. This is a particular problem for frequency bins in which the actual signal level is low. In bins in which the rounding error gets dominant, a large 'penalty' in terms of strongly increased entropy (and thus data rate) is to be paid for the lossless transformation. The penalty is much lower for frequency bins where the rounding errors are not dominant.

Description of Related Art including information disclosed under 37 CFR 1.97 and 1.98

A solution for this problem has been proposed by Fraunhofer in: Yoshikazu Yokotani, Ralf Geiger, Gerald D. T. Schuller, Soontorn Oraintara, K. R. Rao, "Lossless audio coding using the IntMDCT and rounding error shaping", IEEE Transactions on Audio, Speech, and Language Processing, Vol. 14, No. 6, pp. 2201-2211, November 2006. Therein it is proposed to add fixed noise shaping filters to several lifting steps (representing small integer-reversible sub-steps of the transformation) in order to trade rounding error contributions especially from high frequencies to low frequencies. The authors apply a heuristic optimisation criterion to find the noise shaping filter coefficients. A simple variant of this approach is part of the MPEG-4 SLS codec (fixed low-pass filter of first order).

A lifting scheme-based integer transform maps integers to integers and is reversible. The basic idea of such lifting is: for example, if a pair of filters (h,g) is complementary, i.e. it allows for a perfect reconstruction, then for every filter s the pair (h',g) with $h'(z)=h(z)+s(z^2)*g(z)$ allows for perfect reconstruction, too. This is also true for filter t and every pair (h,g') of the form $g'(z)=g(z)+t(z^2)*h(z)$. The converse is also true: if the filter banks (h,g) and (h',g) allow for perfect reconstruction, then there is a unique filter s with $h'(z)=h(z)+s(z^2)*g(z)$.

Each such transform operation of the filter bank is called a lifting step. A sequence of lifting steps may consist of alternating lifts, that is, in one step the low-pass is fixed and the high-pass is changed and in the following step the high-pass is fixed and the low-pass is changed, whereby successive steps of the same direction can be merged.

Another approach that tackles the problem has been published in the area of video coding in: Min Shi, Shengli Xie, "A Lossless Image Compression Algorithm by Combining DPCM with Integer Wavelet Transform", IEEE 6th CAS Symp. on Emerging Technologies: Mobile and Wireless Comm., Shanghai, China, May 31-Jun. 2, 2004. The authors apply a DPCM pre-filter in front of the lossless transformation, whereby the signal is 'whitened' and thus the (also 'white') rounding error noise is effectively shaped similar as the signal spectrum. However, this approach also has some drawbacks: first, to be integer-reversible the pre-filter needs to add rounding errors on itself which degrades the coding performance (see below). Second, the authors apply a 'normal' forward DPCM filter which, however, is not the optimal choice for the addressed problem.

BRIEF SUMMARY OF THE INVENTION

While beneficial on the average, the fixed noise shaping described above may be highly sub-optimal for individual signal blocks.

A problem is to be solved by the invention is to optimise the rounding error noise distribution in an integer-reversible transform using lifting and/or to reduce the data rate necessary to bit-exactly encode a specific audio or video signal, i.e. to improve the encoding/decoding efficiency. This problem is solved by methods and apparatuses for improving the encoding efficiency for an audio or video signal, wherein said signal is processed using an integer-reversible transform for each block of samples of said signal, which integer transform is carried out using lifting steps which represent sub-steps of said integer transform and which lifting steps include rounding operations, and wherein noise shaping for the rounding errors resulting from said lifting steps is performed, and for improving the encoding/decoding efficiency for an audio or video signal, wherein at encoder side said signal was processed using an integer-reversible transform for each block of samples of said signal, which integer transform was carried out using lifting steps which represent sub-steps of said integer transform and which lifting steps include rounding operations, and wherein noise shaping for the rounding errors resulting from said lifting steps was performed.

The invention limits the impact of rounding error noise coming with, or resulting from, each lifting step in the integer-reversible transformation on the data rate of a lossless codec, by using a block-by-block adaptation of the noise shaping. Two basic approaches can be used:

Firstly, the filter coefficients of noise shaping filters for transform or frequency domain coefficients are adapted in individual lifting steps according to the current time domain signal characteristics. A new analytical adaptation rule has been developed that delivers near-optimal filter coefficients.

Further, an additional (optional) iterative procedure yields a locally optimal coefficient set.

Secondly, an auto-regressive (i.e. recursive) pre-filter can be added in front of the lossless transformation. That filter explicitly targets at 'raising' the level of frequency regions with low power to decrease the dominance of rounding errors in these areas. This pre-filter shares the same inventive adaptation rules as the adaptive noise shaping processing for transform or frequency domain coefficients.

Advantageously, these two basic processings can be combined to further improve the compression ratio of a lossless codec.

The audio or video signal sample frames from which the filter coefficients are calculated, can have a different length than the audio or video signal sample blocks to the corresponding transform coefficient blocks of which the filter coefficients are applied.

As an alternative, or in addition, the sample frames can be temporally shifted with respect to the sample blocks, which embodiment has the advantage that the filter coefficients need not be transmitted to the decoder side but can be correspondingly calculated at decoder side.

Instead of calculating the filter coefficients directly from the signal sample frames, they can also be calculated from an error or residuum signal that may be available in the encoding processing, e.g. in a filter bank section of the audio or video signal encoder.

In principle, the inventive encoding method is suited for improving the encoding efficiency for an audio or video signal, wherein said signal is processed using an integer-reversible transform for each block of samples of said signal, which integer transform is carried out using lifting steps which represent sub-steps of said integer transform and which lifting steps include rounding operations, and wherein noise shaping for the rounding errors resulting from said lifting steps is performed, said method including the step:

integer transforming said sample blocks using lifting steps and adaptive noise shaping for at least some of said lifting steps, said transform providing corresponding blocks of transform coefficients and said noise shaping being performed such that rounding noise from low-level magnitude transform coefficients in a current one of said transformed blocks is decreased whereas rounding noise from high-level magnitude transform coefficients in said current transformed block is increased, and wherein filter coefficients of a corresponding noise shaping filter are derived from said audio or video signal samples on a frame-by-frame basis.

In principle the inventive encoding apparatus is suited for improving the encoding efficiency for an audio or video signal, wherein said signal is processed using an integer-reversible transform for each block of samples of said signal, which integer transform is carried out using lifting steps which represent sub-steps of said integer transform and which lifting steps include rounding operations, and wherein noise shaping for the rounding errors resulting from said lifting steps is performed, said apparatus including:

means being adapted for integer transforming said sample blocks using lifting steps and adaptive noise shaping for at least some of said lifting steps, said transform providing corresponding blocks of transform coefficients and said noise shaping being performed such that rounding noise from low-level magnitude transform coefficients in a current one of said transformed blocks is decreased whereas rounding noise from high-level magnitude transform coefficients in said current transformed block is increased;

a corresponding noise shaping filter, the filter coefficients of which are derived from said audio or video signal samples on a frame-by-frame basis.

In principle, the inventive decoding method is suited for improving the encoding/decoding efficiency for an audio or video signal, wherein at encoder side said signal was processed using an integer-reversible transform for each block of samples of said signal, which integer transform was carried out using lifting steps which represent sub-steps of said integer transform and which lifting steps include rounding operations, and wherein noise shaping for the rounding errors resulting from said lifting steps was performed, and wherein said sample blocks were integer transformed using lifting steps and adaptive noise shaping for at least some of said lifting steps, said transform providing corresponding blocks of transform coefficients and said noise shaping being performed such that rounding noise from low-level magnitude transform coefficients in a current one of said transformed blocks is decreased whereas rounding noise from high-level magnitude transform coefficients in said current transformed block is increased, and wherein filter coefficients of a corresponding noise shaping filter were derived from said audio or video signal samples on a frame-by-frame basis, the decoding of said encoded audio or video signal including the step:

integer inverse transforming said sample blocks using lifting steps and adaptive noise shaping for at least some of said lifting steps, said inverse transform operating on blocks of transform coefficients and providing corresponding blocks of output sample values and said noise shaping being performed such that rounding noise from low-level magnitude transform coefficients in a current one of said inverse transformed blocks is decreased whereas rounding noise from high-level magnitude transform coefficients in said current inverse transformed block is increased, and wherein filter coefficients of a corresponding noise shaping filter are derived from the inversely transformed audio or video signal samples on a frame-by-frame basis.

In principle the inventive decoding apparatus is suited for improving the encoding/decoding efficiency for an audio or video signal, wherein at encoder side said signal was processed using an integer-reversible transform for each block of samples of said signal, which integer transform was carried out using lifting steps which represent sub-steps of said integer transform and which lifting steps include rounding operations, and wherein noise shaping for the rounding errors resulting from said lifting steps was performed, and wherein said sample blocks were integer transformed using lifting steps and adaptive noise shaping for at least some of said lifting steps, said transform providing corresponding blocks of transform coefficients and said noise shaping being performed such that rounding noise from low-level magnitude transform coefficients in a current one of said transformed blocks is decreased whereas rounding noise from high-level magnitude transform coefficients in said current transformed block is increased, and wherein filter coefficients of a corresponding noise shaping filter were derived from said audio or video signal samples on a frame-by-frame basis, the apparatus being suited for decoding said encoded audio or video signal, and including:

means being adapted for integer inverse transforming said sample blocks using lifting steps and adaptive noise shaping for at least some of said lifting steps, said inverse transform operating on blocks of transform coefficients and providing corresponding blocks of output sample values and said noise shaping being performed such that rounding noise from low-level magnitude transform coefficients in a current one of said inverse transformed blocks is decreased whereas rounding noise from high-level magnitude transform coefficients in said current inverse transformed block is increased;

a corresponding noise shaping filter, the filter coefficients of which are derived from the inversely transformed audio or video signal samples on a frame-by-frame basis.

Advantageous additional embodiments of the invention are disclosed in the respective dependent claims.

For example, the filter coefficients of the noise shaping filter can be derived on a frame-by-frame basis from an error or residuum signal available in the decoding processing of said audio or video signal, e.g. in a filter bank section of the audio or video signal decoding.

The noise shaping filter can be a pre-filter (post-filter) that is not arranged within the integer transform (inverse integer transform) but is arranged upstream (downstream) the integer transform (inverse integer transform).

The upstream (downstream) noise shaping pre-filter (post-filter) can also be a filter in addition to the noise shaping filter arranged within the integer transform (inverse integer transform).

BRIEF DESCRIPTION OF THE SEVERAL VIEWS OF THE DRAWING(S)

Figure 2:
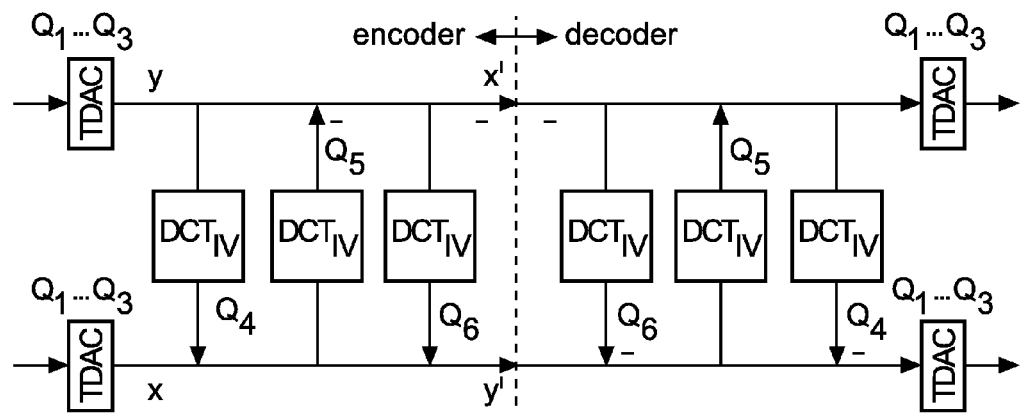
Figure 3:
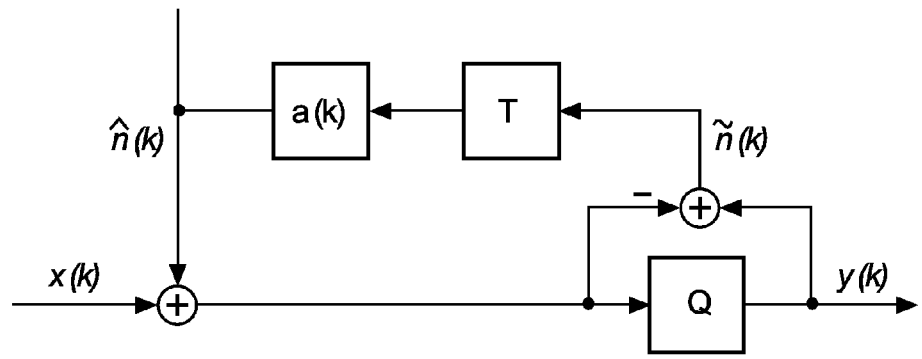
Figure 4:
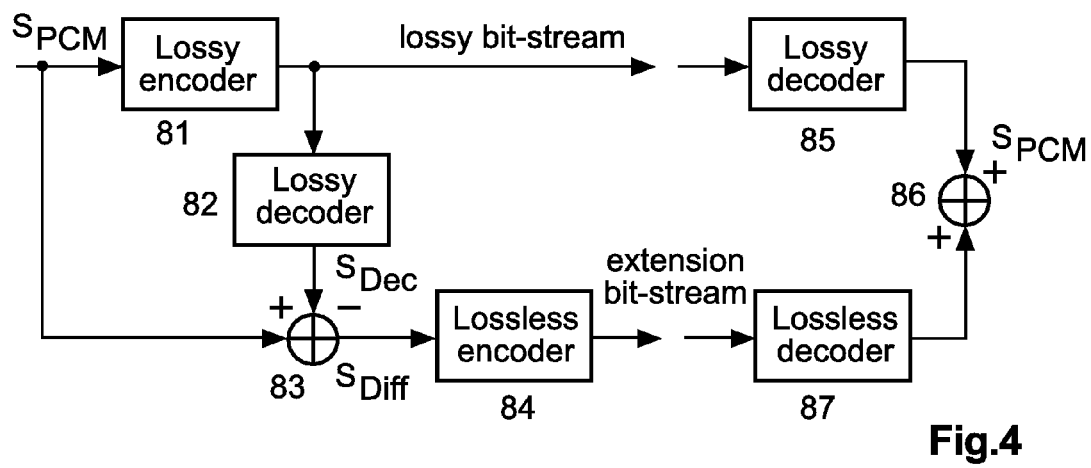
Figure 5:
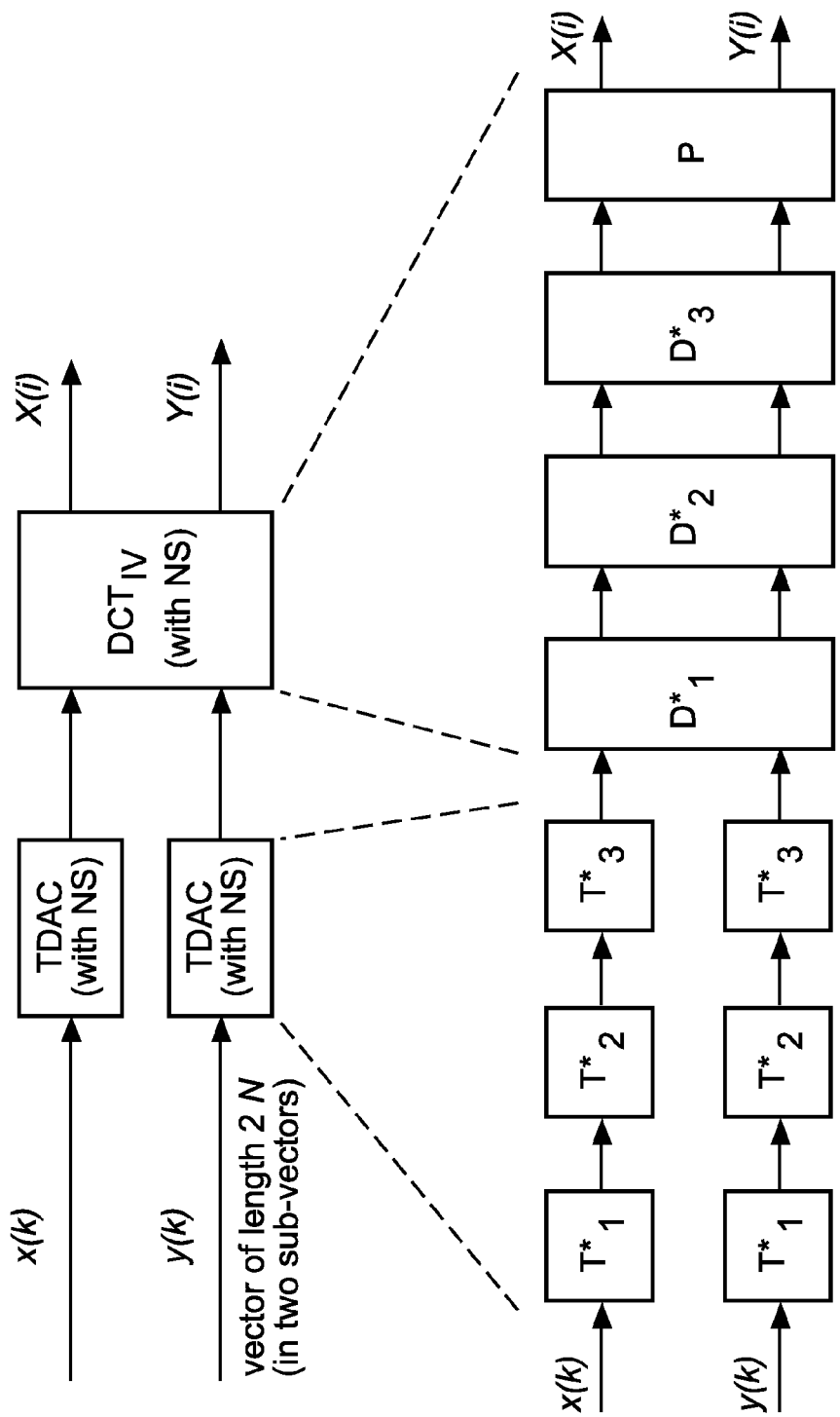
Figure 6:
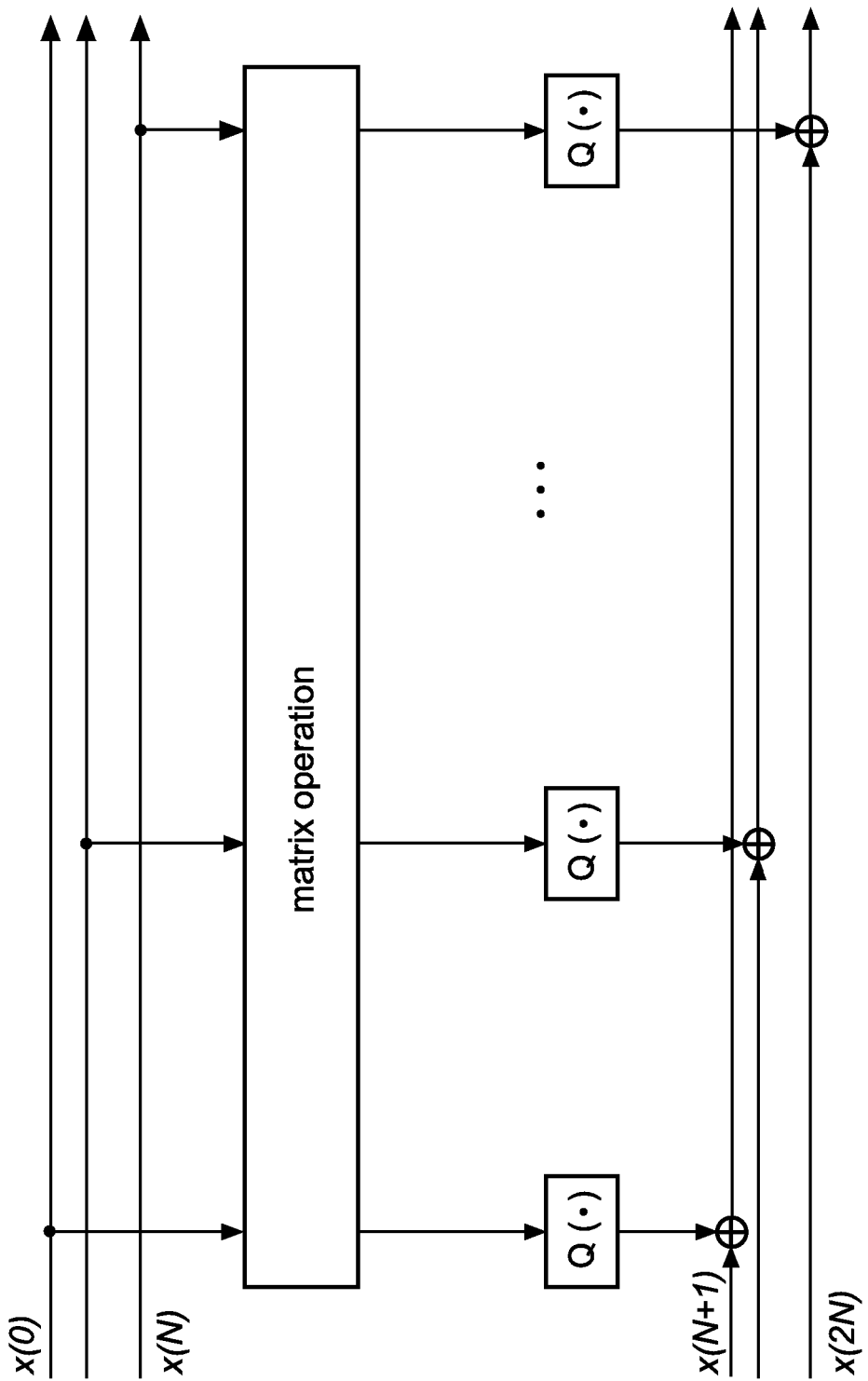
Figure 7:
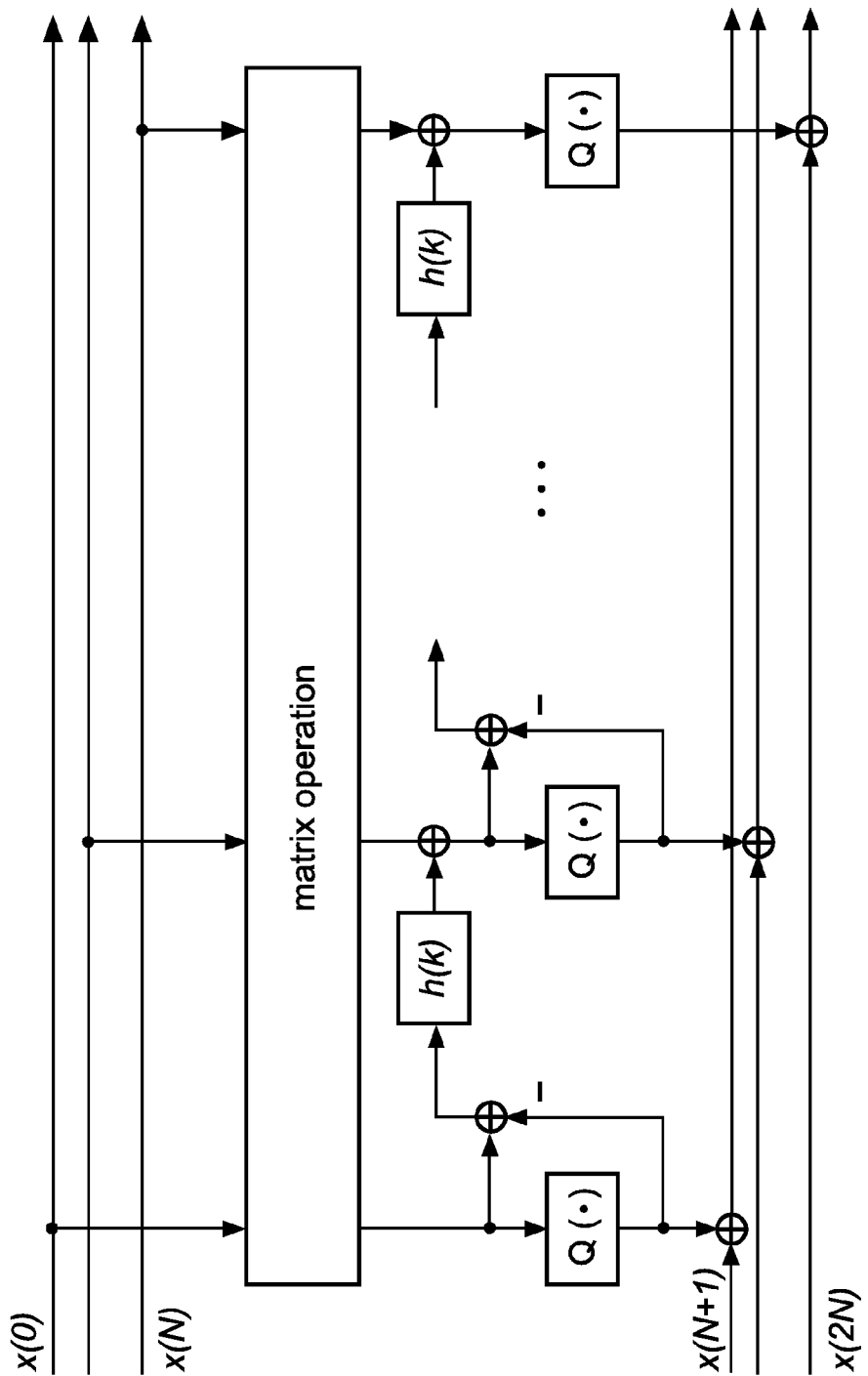
Figure 8:
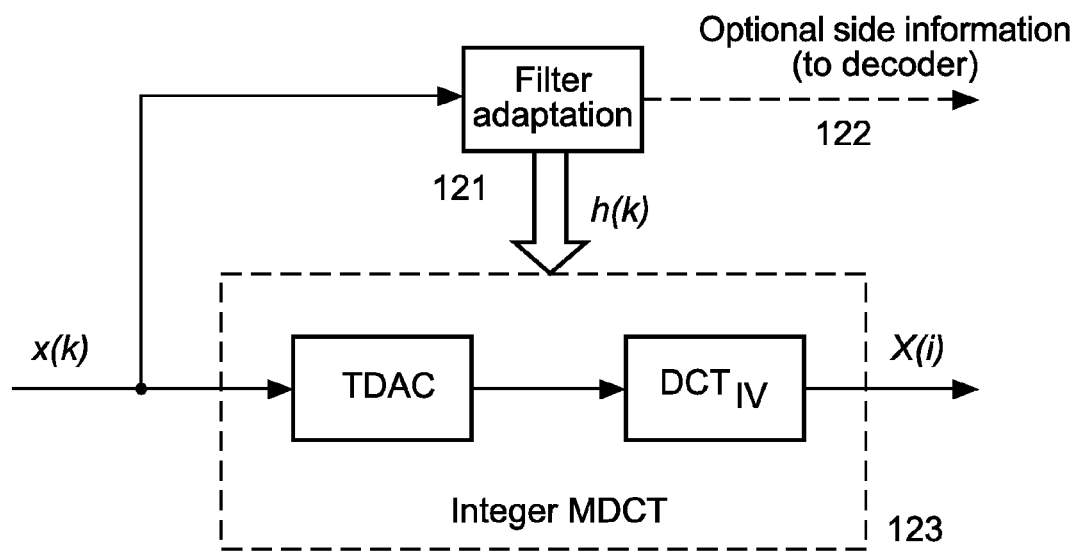
Figure 9:
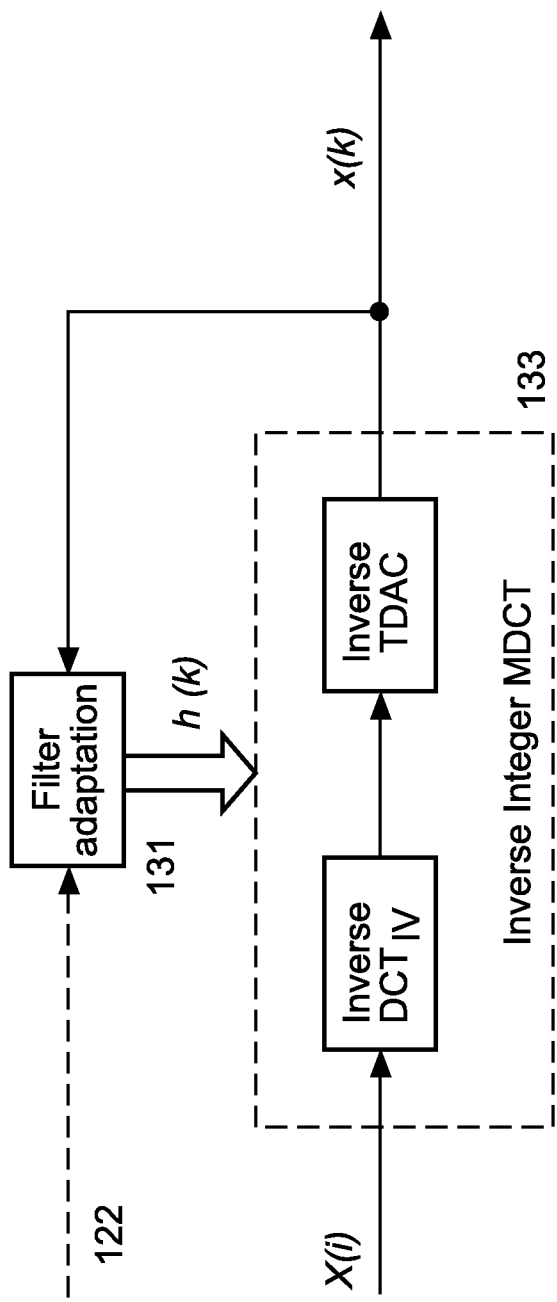
Figure 10:
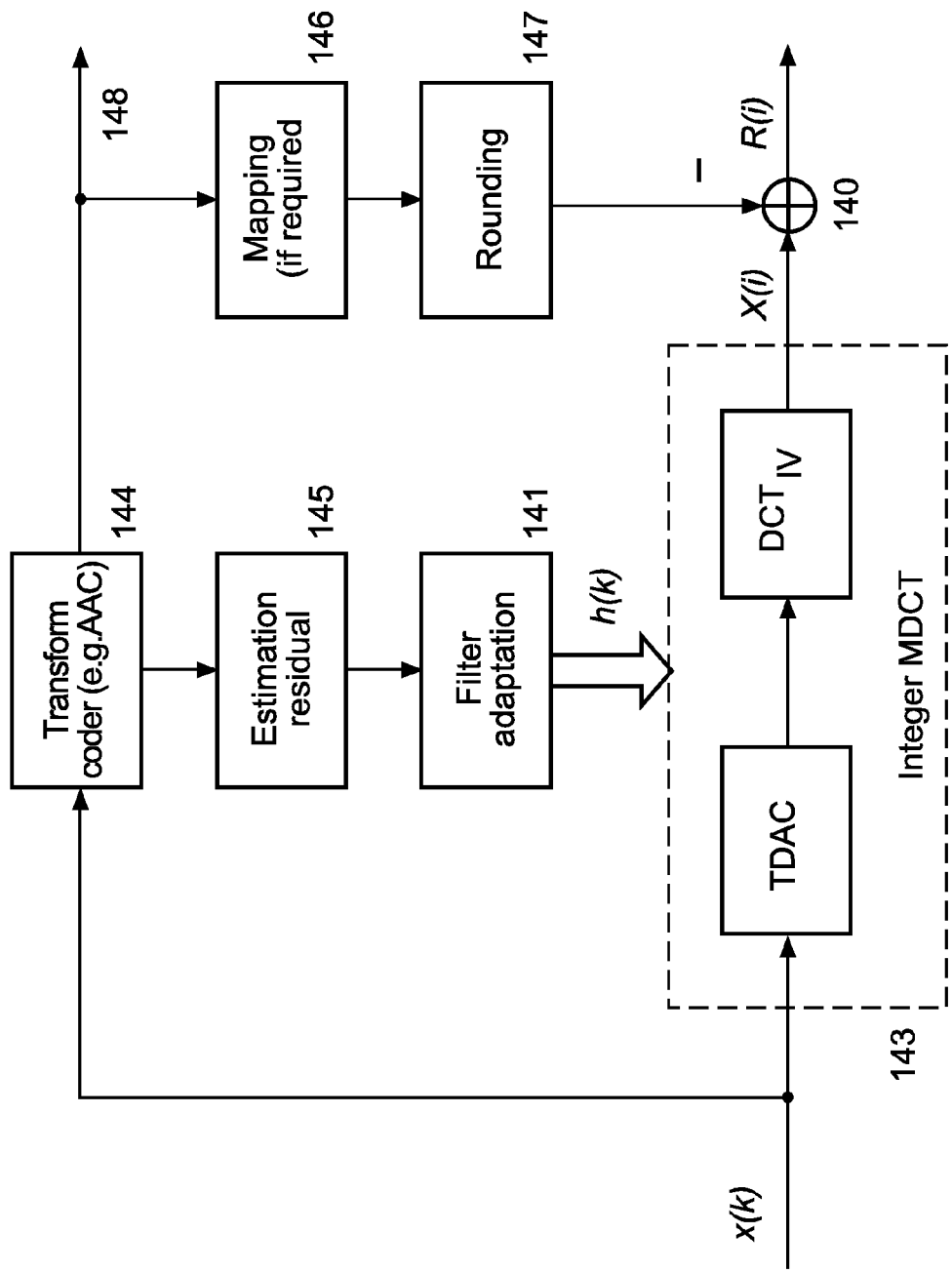
Figure 11:
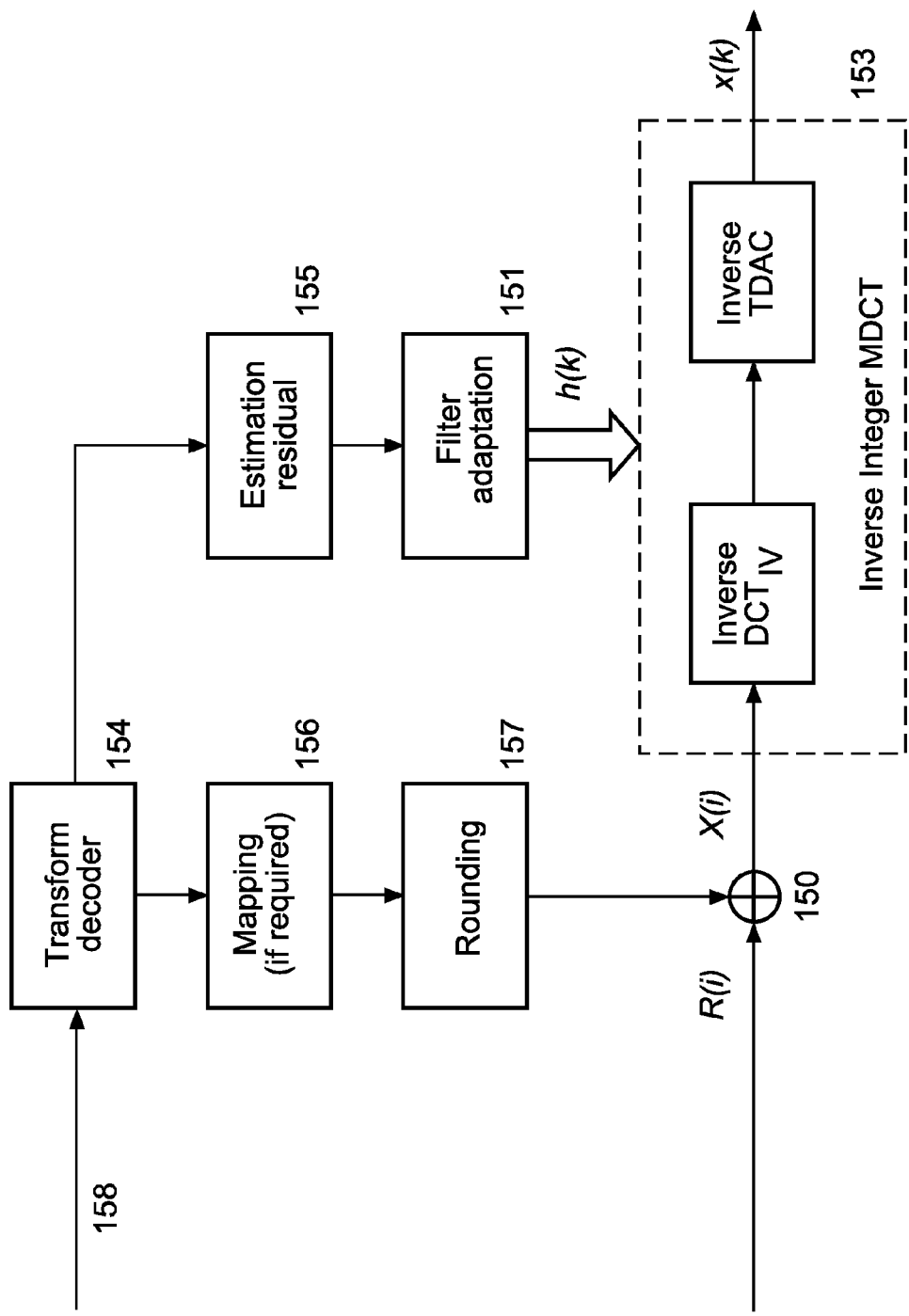
Figure 12:
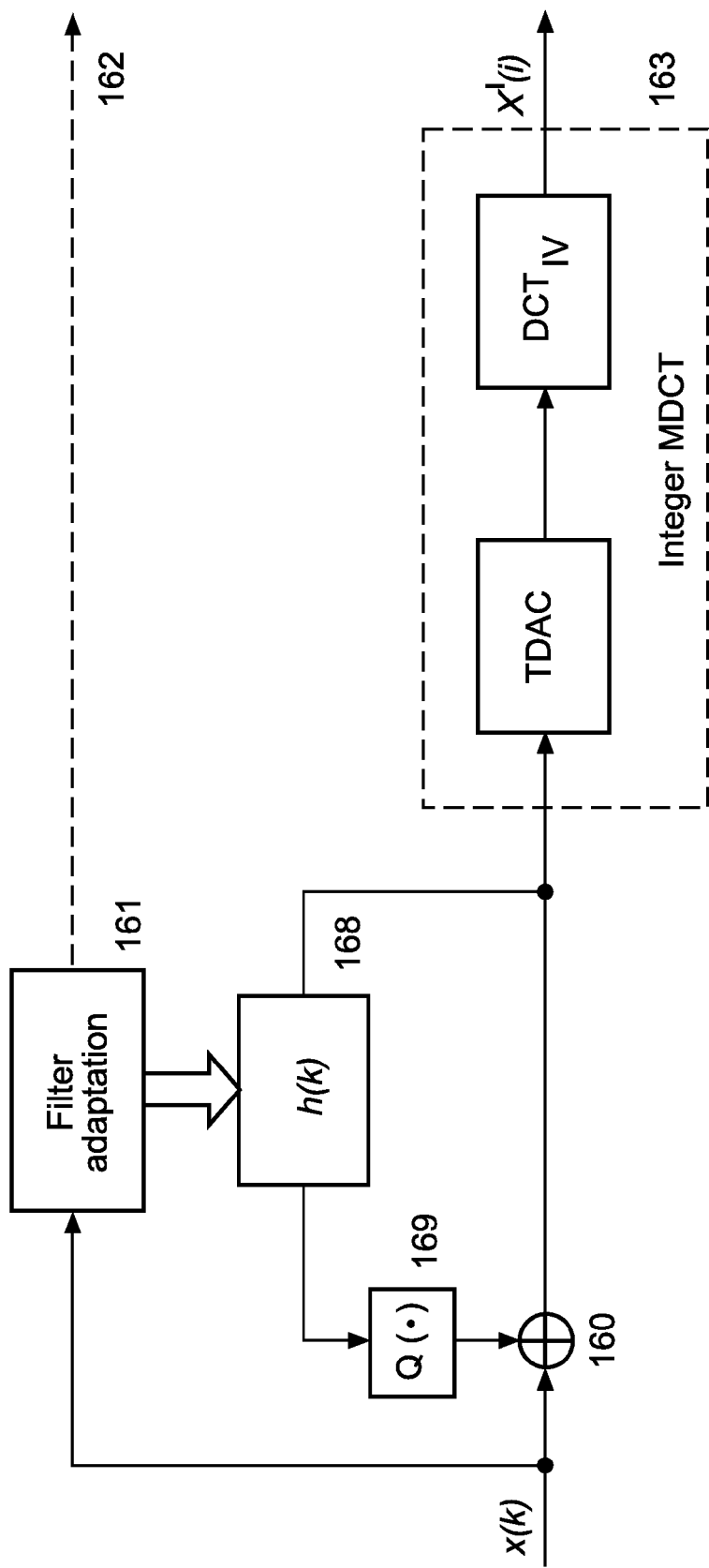
Figure 13:
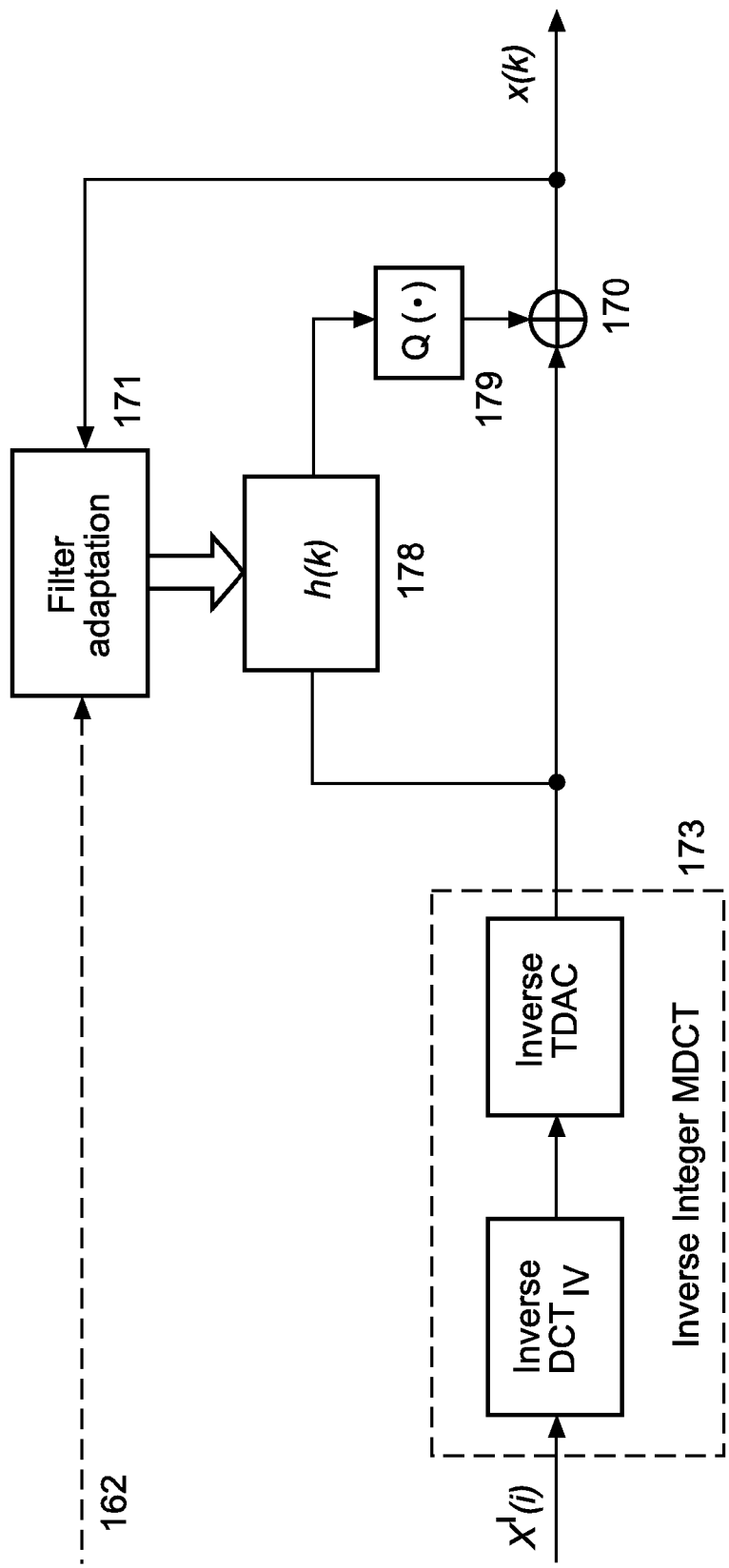

Exemplary embodiments of the invention are described with reference to the accompanying drawings, which show in:

FIG. 1 For TDAC, decomposition of a Givens rotation into three consecutive lifting steps, wherein each lifting step comes with a rounding operation;

FIG. 2 Multi-dimensional lifting scheme applied for two parallel input signals (stereo case), wherein the two input signals x and y have already been subject to rounding error noise in the TDAC blocks;

FIG. 3 Rounding using noise shaping;

FIG. 4 Basic block diagram for a known lossy based lossless encoder and decoder;

FIG. 5 Decomposition of Integer MDCT;

FIG. 6 Known single multi-dimensional lifting step without noise shaping;

FIG. 7 Known noise shaping in a single multi-dimensional lifting step;

FIG. 8 Inventive adaptive noise shaping IntMDCT, stand-alone variant;

FIG. 9 Inventive adaptive noise shaping inverse IntMDCT, stand-alone variant;

FIG. 10 Inventive adaptive noise shaping IntMDCT, scalable-to-lossless transform coder;

FIG. 11 Inventive adaptive noise shaping Inverse IntMDCT, scalable-to-lossless transform coder;

FIG. 12 Inventive adaptive pre-filter IntMDCT, stand-alone variant;

FIG. 13 Inventive adaptive pre-filter inverse IntMDCT, stand-alone variant.

DETAILED DESCRIPTION OF THE INVENTION

The Integer MDCT (IntMDCT) is an approximation of the normal MDCT algorithm that allows for bit-exact reconstruction of the original PCM samples. This feature is achieved by decomposition of all algorithmic steps into lifting steps, which are, step-by-step, bit-exactly reversible. More information can be found e.g. in: Ralf Geiger, Yoshikazu Yokotani, Gerald Schuller, Jürgen Herre, "Improved integer transforms using multi-dimensional lifting", Proc. of ICASSP, volume 2, pages 17-21, Montreal, Canada, May 2004.

The lossless (i.e. bit-exact) reconstruction property comes at the cost of additive error: the rounding operation in each lifting step adds rounding error noise. It is a target of this invention to quantify the variances of these round-ing errors and to assess their impact for the compression ratio of a lossless codec. Then, noise shaping filters and/or pre-filters are used to optimise for minimum entropy. Solutions for fixed and adaptive filters are disclosed.

A) Rounding Errors

Rounding errors are introduced in most of the lifting steps in the IntMDCT, see Y. Yokotani, R. Geiger, G. D. T. Schuller, S. Oraintara, K. R. Rao, "Lossless audio coding using the IntMDCT and rounding error shaping", IEEE Transactions on Audio, Speech, and Language Processing, 14(6):2201-2211, November 2006, for details and derivations. In the following subsections, the sources of rounding errors are briefly summarised and some definitions are given.

A.1) Time Domain Alias Cancellation (TDAC)

The decomposition of the TDAC and the windowing operation (Givens rotation) into three lifting steps is shown in FIG. 1. Such windowing operation for each block or section of the input audio or video signal is usually connected with weighting the amplitudes or magnitudes in the blocks or sections, e.g. by using a sine or cosine function weighting and 50% overlapped windowing. The interpretation of the three rounding operations as corresponding additive noise $n_1, n_2, n_3$ values yields $$c' = a \cos \alpha - b \sin \alpha + n_1 \cos \alpha + n_2 cs\alpha + n_3 \quad (1)$$

$$d' = a \sin \alpha + b \cos \alpha + n_1 \sin \alpha + n_2 \quad (2)$$

$$\text{with } cs\alpha = (\cos \alpha - 1)/\sin \alpha \quad (3)$$

and the set of angles $\alpha$ defining the window function. For a sine window the angles are defined by $$\alpha = \frac{\pi}{4} \cdot \frac{n - 0.5}{N/2}, n = 1.2 \ldots N/2, N = 576.$$

In general, $0 \leq \alpha \leq \pi/4$.

The powers of the rounding errors depend on the rotation angle $\alpha$ of the Givens rotation (c and d denote the non-quantised desired outputs of the Givens rotation):

$$E\{(c' - c)^2\} = \frac{1}{12}(\cos^2 \alpha + cs^2 \alpha + 1) \quad (4, 5)$$

$$E\{(d' - d)^2\} = \frac{1}{12}(\sin^2 \alpha + 1).$$

As mentioned above, FIG. 1 shows the decomposition of a Givens rotation into three consecutive lifting steps, wherein each lifting step comes with a rounding operation. The input values are a and b, and the output values are c' and d' (cf. equations (1) and (2). $Q_1$, $Q_2$ and $Q_3$ denote quantisation steps.

The first lifting step calculates $a+Q_1(cs\ \alpha*b)$, the second lifting step calculates $$b+Q_2(\sin \alpha[a+Q_1(cs\alpha*b)]),$$

and the third lifting step calculates $$a+Q_1(cs\alpha*b)+Q_3[cs\alpha(b+Q_2(\sin \alpha[a+Q_1(cs\alpha*b)]))].$$

For sine windows the average power of the rounding error noise from the TDAC part of the Integer MDCT is about 1.6/12. This value can be derived theoretically by averaging the expression $\frac{1}{2}E\{(c'-c)^2\}+\frac{1}{2}E\{(d'-d)^2\}$ for all utilised values of $\alpha$. That average power value has further been verified by simulations.

A.2) Multi-Dimensional Lifting Scheme: Stereo Version

The two parallel input signal multi-dimensional lifting scheme or the stereo multi-dimensional lifting scheme is depicted in FIG. 2. The two input signals x and y have already been subject to rounding error noise in the TDAC blocks TDAC1 and TDAC2, cf. FIG. 1. The output vectors of the encoder-side TDAC block are denoted by x and y for the lower and upper part, respectively. Then, the respective encoder output vectors in the IntMDCT domain (before the decoder) constitute as:

$$X' = DCT_{IV}\{x\} + DCT_{IV}\{n_4\} - n_5 \quad (6)$$

$$Y' = DCT_{IV}\{y\} + DCT_{IV}\{n_5\} - n_6 \quad (7)$$

wherein '$DCT_{IV}$' means a DCT of type IV (i.e. an Integer MDCT), $n_4$, $n_5$ and $n_6$ are quantisation error signals and $Q_4$, $Q_5$ and $Q_6$ represent quantisation operations. According to the block diagram, each resulting 'spectrum' is a mixture of the actual MDCT spectrum, e.g. $DCT_{IV}\{x\}$, and some additive noise which is constituted of frequency-domain and time-domain errors. At decoder side, the three transform lifting steps are reversed, followed by corresponding TDAC blocks TDAC3 and TDAC4. The ambiguous time-frequency characteristics of the intermediate and finally resulting vectors in the encoding makes comprehension and filter optimisation difficult.

A.3) Pre-Filter

Preferably, a pre-processing of input signals by a digital filter is carried out in front of the TDAC processing. This can be realised by an auto-regressive (AR) or moving average (MA) filter. The pre-filter is to be implemented in a integer reversible manner. This means that the filter characteristics must be strictly minimum phase. Furthermore, the filter structures applied in the encoder and decoder have to be perfectly inverse. Therefore the filter operation includes at least one rounding operation of intermediate values (output of predictor) to integer values. This means that a pre-filter will always come along with additional rounding error noise.

There are strong similarities between optimisation of the noise shaping within the IntMDCT and optimisation of the pre-filter. Differences are that the pre-filter also positively affects the impact of the final quantisation stages ($Q_5/n_5$ and $Q_6/n_6$ in FIG. 2; $Q_x$ is the mathematical description for the non-linear quantisation operation, $n_x$ is the resulting additive quantisation error), that the computational complexity for similar filter order is less, and that the pre-filter will produce additional rounding errors.

B) Rounding with Noise Shaping

The frequency characteristics of rounding errors can be shaped using a noise shaping filter as illustrated in FIG. 3. The original quantisation noise ñ(k) resulting from the quantiser Q output signal y(k) is determined and filtered by a finite impulse response (fir) filter with the impulse response a(k) and delay T. The correspondingly filtered noise n̂(k) is fed back into the input signal x(k). In the sequel it is assumed that the noise shaping filter a(k) has the order p and is causal. Then, including the preceding delay operation, the filter has the following transfer function:

$$G(z) = 1 + z^{-1}A(z) \quad (8,9)$$

$$= 1 + \sum_{\lambda=1}^{P} a_\lambda z^{-\lambda}.$$

where A(z) represents the z-transform of a(k) and $\alpha_\lambda$ are the filter coefficients. The filter coefficients $\alpha_\lambda$, $\lambda=1 \ldots p$, can be modified freely to obtain different frequency characteristics.

Particularly interesting is the frequency response in relation to the centre frequencies of the discrete MDCT. If i denotes the discrete frequency index with $i=0, 1, \ldots, N-1$, the centre frequency of the i-th frequency bin of the MDCT is given by $\Omega_i = (2\pi(i+0.5))/2N$ in angular representation, wherein N is the length of the MDCT.

The frequency response of the noise shaping filter becomes:

$$G(i) = 1 + \sum_{\lambda=1}^{P} a_\lambda e^{-j\lambda\Omega_i} \quad (10, 11, 12)$$

$$|G(i)|^2 = \left|1 + \sum_{\lambda=1}^{P} a_\lambda e^{-j\lambda\Omega_i}\right|^2$$

$$= \left(1 + \sum_{\lambda=1}^{P} a_\lambda \cos(\lambda\Omega_i)\right)^2 + \left(\sum_{\lambda=1}^{P} a_\lambda \sin(\lambda\Omega_i)\right)^2.$$

In the later following calculations the partial differentiation of the frequency response for the γ-th filter coefficient $\alpha_\gamma$ is required (equations 13, 14, 15):

$$\frac{\partial |G(i)|^2}{\partial a_\gamma} = 2\cos(\gamma\Omega_i)\left(1 + \sum_{\lambda=1}^{P} a_\lambda \cos(\lambda\Omega_i)\right) +$$

$$2\sin(\gamma\Omega_i)\left(\sum_{\lambda=1}^{P} a_\lambda \sin(\lambda\Omega_i)\right)$$

$$= 2\cos(\gamma\Omega_i) + 2\sum_{\lambda=1}^{P} a_\lambda (\cos(\lambda\Omega_i)\cos(\gamma\Omega_i) +$$

$$\sin(\lambda\Omega_i)\sin(\gamma\Omega_i))$$

$$= 2\cos(\gamma\Omega_i) + 2\sum_{\lambda=1}^{P} a_\lambda \cos((\lambda-\gamma)\Omega_i).$$

Due to the noise shaping filtering, also the time-domain characteristics of the rounding error noise are modified. In addition to introducing correlation, the noise shaping filter increases the variance of the resulting noise signal n(k):

$$E\{n^2(k)\} = E\{(\tilde{n}(k) * g(k))^2\} \quad (16, 17, 18, 19)$$

$$= E\left\{\left(\tilde{n}(k) + \sum_{\lambda=1}^{P} a_\lambda \tilde{n}(k-\lambda)\right)^2\right\}$$

$$= E\{\tilde{n}^2(k)\} + \sum_{\lambda=1}^{p} a_\lambda^2 E\{\tilde{n}^2(k-\lambda)\}$$

$$= E\{\tilde{n}^2(k)\}\left(1 + \sum_{\lambda=1}^{p} a_\lambda^2\right).$$

In this derivation the auto-correlation of the original quantisation noise is assumed to be zero outside of the origin, i.e. $E\{n(k)n(k-\gamma)\}=0$ if $\gamma \neq 0$. Note that any non-zero coefficient $\alpha \neq 0$ will increase the power of the effective quantisation noise in time domain.

C) Rounding Error Noise and Differential Entropy

To simplify the following investigation, it is assumed that the input signal is random noise with Gaussian probability density function (PDF) and that it is at least short-term stationary. However, the frequency characteristics of the input signal are not restricted.

Let x(k) denote the time domain representation of the input signal. If the aforementioned random input signal is transformed via the normal (floating-point) MDCT, the frequency domain representation X(i), short $X_i$, is obtained where i denotes the frequency index. The frame index is omitted for comprehensibility. Because the input signal is assumed stationary random noise, the MDCT bins are also random with the individual variances $\sigma_{X_i}^2$. The differential entropy of the i-th frequency bin is $h(X_i) = \frac{1}{2}\log_2(2\pi e \sigma_{X_i}^2)$. (20)

Adding rounding error noise in a lifting step operation adds individual noise components to each frequency bin. The noise variance in the i-th bin is denoted by $\sigma_{N_i}^2$ and it is assumed that the signal components $X_i$ and noise components $N_i$ in each bin are mutually independent. Then, the differential entropy of the noisy frequency bin is:

$$h(X_i + N_i) = \frac{1}{2}\log_2(2\pi e(\sigma_{X_i}^2 + \sigma_{N_i}^2)) \quad (21, 22, 23)$$

$$= \frac{1}{2}\log_2(2\pi e \sigma_{X_i}^2) + \frac{1}{2}\log_2\left(1 + \frac{\sigma_{N_i}^2}{\sigma_{X_i}^2}\right)$$

$$= h(X_i) + h_i^+.$$

That is, the differential entropy 'suffers' from a penalty $h_i^+$ that depends on the individual signal-to-noise ratio. Over the full frequency range, these individual penalties add up to increase the gross bit rate required at least to encode each block (Note: assuming a simplified direct mapping between differential entropy and bit rate of the bit stream after quantisation and encoding. In practice, there may be additional losses because of sub-optimal entropy coding etc.):

$$H^+ = \sum_{i=0}^{N-1} h_i^+. \quad (24)$$

It is the target of the following derivations to obtain an adaptation rule for the noise shaping filter that minimises this gross penalty for each block.

According to the derivations from the previous section B), the variance of the noise components in the i-th frequency bin is modelled as:

$$\sigma_{N_i}^2 = |kG(i)|^2 \quad (25, 26)$$

$$= k^2\left(1 + \sum_{\lambda=1}^{p} a_\lambda \cos(\lambda\Omega_i)\right)^2 + k^2\left(\sum_{\lambda=1}^{p} a_\lambda \sin(\lambda\Omega_i)\right)^2,$$

where $\Omega_i = (2\pi(i+0.5))/2N$ and the scalar factor $k^2$ is an arbitrary factor describing the variance of the original rounding error noise $\tilde{n}(k)$. The partial differentiation for the $\gamma$-th coefficient $\alpha_\lambda$ is:

$$\frac{\partial |kG(i)|^2}{\partial a_\gamma} = 2k^2 \cos(\gamma\Omega_i) + 2k^2 \sum_{\lambda=1}^{p} a_\lambda \cos((\lambda-\gamma)\Omega_i), \quad (27)$$

see the derivation of equations 13 to 15 above.

C.1) Approximate Solution

Now, the coefficients $\alpha_\lambda$ shall be optimised in order to minimise the total penalty $H^+$. For simplification, low quantisation noise is first assumed, i.e. it is assumed:

$$h_i^+ = \frac{1}{2}\log_2\left(1 + \frac{\sigma_{N_i}^2}{\sigma_{X_i}^2}\right) \quad (28, 29)$$

$$\approx \frac{1}{2\ln 2} \cdot \frac{\sigma_{N_i}^2}{\sigma_{X_i}^2},$$

whereby the approximation $\log(1+x) \approx x$ is used which is valid for $x \ll 1$. In signal processing terms, it is thereby assumed that $\sigma_{N_i}^2 \ll \sigma_{X_i}^2$ is valid in all frequency bins.

The full penalty $H^+$ amounts to:

$$H^+ = \sum_{i=0}^{N-1} h_i^+ \quad (30, 31)$$

$$\approx \frac{k^2}{2\ln 2} \sum_{i=0}^{N-1} \frac{|G(i)|^2}{\sigma_{X_i}^2}.$$

Partial differentiation for the coefficient $\alpha_\lambda$ delivers:

$$\frac{\partial H^+}{\partial \alpha_\gamma} \approx \frac{k^2}{2\ln 2} \sum_{i=0}^{N-1} \frac{1}{\sigma_{X_i}^2} \cdot \frac{\partial |G(i)|^2}{\partial \alpha_\gamma} \quad (32, 33)$$

$$= \frac{k^2}{\ln 2}\left(\sum_{i=0}^{N-1} \frac{\cos(\gamma\Omega_i)}{\sigma_{X_i}^2} + \sum_{\lambda=1}^{p} \alpha_\lambda \sum_{i=0}^{N-1} \frac{\cos((\gamma-\lambda)\Omega_i)}{\sigma_{X_i}^2}\right).$$

Setting this partial differentiation to zero leads to a set of equations to be solved for finding the coefficients with minimum entropy penalty:

$$\frac{\partial H^+}{\partial \alpha_\gamma} \stackrel{!}{=} 0 \quad (34, 35)$$

$$\sum_{\lambda=1}^{p} \alpha_\lambda \sum_{i=0}^{N-1} \frac{\cos((\gamma-\lambda)\Omega_i)}{\sigma_{X_i}^2} = -\sum_{i=0}^{N-1} \frac{\cos(\gamma\Omega_i)}{\sigma_{X_i}^2}.$$

At this point there are p equations to solve for p unknowns. For comprehensibility, the set of equations can be expressed in matrix vector notation. The following vectors and matrices are defined:

$$a = [\alpha_1, \alpha_2, \ldots, \alpha_p]^T \quad (36, 37, 38)$$

$$M = \begin{pmatrix} R(0) & R(1) & R(2) & \ldots & R(p-1) \\ R(1) & R(0) & R(1) & & \\ R(2) & R(1) & R(0) & & \\ \vdots & & & \ddots & \vdots \\ R(p-1) & & & \ldots & R(0) \end{pmatrix}$$

$$e = [-R(1), -R(2), \ldots, -R(p)]^T,$$

wherein the abbreviation $$R(\kappa) = \sum_{i=0}^{N-1} \frac{\cos(\kappa\Omega_i)}{\sigma_{X_i}^2}, \kappa \in \mathcal{N}. \quad (39)$$

is used.

This set of equations from above gives the linear equation system $$M \cdot a = e. \quad (40)$$

This can be solved by inversion of the Toeplitz matrix M:

$$a_{opt} = M^{-1} \cdot e. \quad (41)$$

Note that the quantity $R(\kappa)$ is equivalent to the autocorrelation function of a signal with the inverse spectrum of the input signal $x(k)$. Consequently, the optimisation method strongly resembles block-based adaptation of a linear prediction filter using the normal equations, compare e.g. P. Vary and R. Martin, "Digital Speech Transmission: Enhancement, Coding and Error Concealment", John Wiley & Sons Ltd, 2006, Sec. 6.2. Therefore, after computation of the pseudo-autocorrelation values $R(\kappa)$, the full collection of numerical methods to optimise linear prediction filters can be utilised, e.g. the computationally efficient Levinson-Durbin algorithm.

The filter coefficients of the adaptive noise shaping filters are determined by computing the inverse power spectrum of a signal sample frame, whereby the filter coefficients are optimised such as to minimise the mean spectral distance between the inverse power spectrum and the frequency response of an all-pole filter corresponding to these filter coefficients.

I.e., the optimisation of the filter coefficients is performed by a linear prediction analysis based on the inverse power spectrum of the signal sample frame.

The inverse power spectrum can be transformed into pseudo-autocorrelation coefficients before the optimisation of the filter coefficients is performed.

C.2) Towards the Exact Solution

In the previous Section, an approximation is used to obtain a linear optimisation problem. To achieve a more exact solution, the exact term is to be used to express the entropy penalty:

$$H^+ = \sum_{i=0}^{N-1} \frac{1}{2} \log_2\left(1 + \frac{|kG(i)|^2}{\sigma_{X_i}^2}\right). \quad (42)$$

Partial differentiation for the $\gamma$-th filter coefficient yields the term:

$$\frac{\partial H^+}{\partial \alpha_\gamma} = \frac{1}{2\ln 2} \sum_{i=0}^{N-1} \frac{\frac{\partial |G(i)|^2}{\partial \alpha_\gamma}}{\frac{\sigma_{X_i}^2}{k^2} + |G(i)|^2} \quad (43, 44)$$

$$= \frac{1}{\ln 2} \sum_{i=0}^{N-1} \frac{\cos(\gamma\Omega_i) + \sum_{\lambda=1}^{p} \alpha_\lambda \cos((\lambda-\gamma)\Omega_i)}{\frac{\sigma_{X_i}^2}{k^2} + \left(1 + \sum_{\lambda=1}^{p} \alpha_\lambda \cos(\lambda\Omega_i)\right)^2 + \left(\sum_{\lambda=1}^{p} \alpha_\lambda \sin(\lambda\Omega_i)\right)^2}.$$

Unfortunately, this term is non-linear. A simple analytical solution for $$\frac{\partial H^+}{\partial \alpha_\gamma} \stackrel{!}{=} 0.$$

can not be found. However, numerical methods can be applied for iteration towards the optimum solution. For example, an iterative gradient descent optimisation processing or an iterative steepest descent processing can be implemented for further refining to optimised filter coefficients. In this process the set of coefficients $a=[a_1, a_2, \ldots, a_p]^T$ is refined in each iteration step by taking a small step into the direction of the steepest (negative) gradient $$a^{(\mu+1)} = a^{(\mu)} - \theta \operatorname{grad} H^+(a^{(\mu)}) \quad (45)$$

where $\mu$ denotes the iteration index and the gradient is defined as $$\operatorname{grad} H^+(a^{(\mu)}) = \quad (46)$$

$$\frac{\partial H^+(a^{(\mu)})}{\partial \alpha_0}\begin{pmatrix}1\\0\\\vdots\\0\end{pmatrix} + \frac{\partial H^+(a^{(\mu)})}{\partial \alpha_1}\begin{pmatrix}0\\1\\\vdots\\0\end{pmatrix} + \ldots + \frac{\partial H^+(a^{(\mu)})}{\partial \alpha_p}\begin{pmatrix}0\\0\\\vdots\\1\end{pmatrix}.$$

The scalar factor $\theta$ specifies a step size. It can be used to control the speed of the adaptation. The iterations are repeated e.g. until the coefficient set has converged to a stable solution. A too large step size may lead to instable convergence behaviour.

This processing will find a local solution for the p-dimensional optimisation problem. The final result may differ depending on the starting point of the iterative algorithm, i.e. on the initial coefficient set $a^{(0)}$. Consistent results have been obtained by starting with the approximate solution as given in the previous Section. Nevertheless, it is not guaranteed that the solution reflects a global optimum of the original problem to minimise $H^+$.

Furthermore, it is not guaranteed that the final coefficient set yields a minimum-phase filter response. This means that the result is to be checked for minimum-phase properties before it is applied within a pre-filter.

The effect of this adaptive noise shaping is that rounding noise from low-level magnitude samples in a current one of the input signal blocks or sections is decreased whereas rounding noise from high-level magnitude samples in the current block or section is increased. 'Low-level magnitude' and 'high-level magnitude' means smaller or greater, respectively, than e.g. the average magnitude level in the block or a threshold magnitude level for the block.

The above optimisation does apply for adaptation of moving average noise shaping filters. Advantageously, the same adaptation rules can be applied for optimising an auto-regressive (all-pole) pre-filter.

C.3) Moving Average (MA) Pre-Filter

For deriving the optimal coefficients for a moving average (finite impulse response) pre-filter, regarding the filter structure, this processing closely resembles 'classical' pre-emphasis or linear prediction. However, the optimisation criterion is different for the present problem than for these well-investigated scenarios.

As a result of the pre-filtering, a different power spectrum of the signal in the MDCT domain is observed now: $\sigma_{X_i}^2 |G(i)|^2$ is got instead of $\sigma_{X_i}^2$. It is assumed that the rounding error noise in the MDCT domain is white if adaptive noise shaping is not applied in addition to the pre-filter. Then, the noise power spectrum is a constant $\sigma_{N_i}^2 = k^2$. Accordingly, the optimisation criterion is defined by:

$$H^+ = \sum_{i=0}^{N-1} \frac{1}{2}\log_2\left(1 + \frac{k^2}{\sigma_{X_i}^2 |G(i)|^2}\right) \quad (47, 48)$$

$$\approx \frac{1}{2\ln 2} \sum_{i=0}^{N-1} \frac{k^2}{\sigma_{X_i}^2 \cdot |G(i)|^2}.$$

Note that the definition of $|G(i)|^2$ is not changed. Partial differentiation of the approximation for the $\gamma$-th filter coefficient yields the term:

$$\frac{\partial H^+}{\partial \alpha_\gamma} = \frac{-k^2}{2\ln 2}\sum_{i=0}^{N-1} \frac{\frac{\partial |G(i)|^2}{\partial \alpha_\gamma}}{\sigma_{X_i}^2 \cdot (|G(i)|^2)^2} \quad (49, 50)$$

$$= \frac{k^2}{\ln 2}\sum_{i=0}^{N-1} \frac{\cos(\gamma\Omega_i) + \sum_{\lambda=1}^{p} \alpha_\lambda \cos((\lambda-\gamma)\Omega_i)}{\sigma_{X_i}^2 \cdot \left(\left(1+\sum_{\lambda=1}^{p}\alpha_\lambda\cos(\lambda\Omega_i)\right)^2 + \left(\sum_{\lambda=1}^{p}\alpha_\lambda\sin(\lambda\Omega_i)\right)^2\right)^2}.$$

Again, the term is non-linear, and an analytical solution to the optimisation problem is difficult to derive. However, the same iterative 'steepest descent' optimisation procedure as defined in the previous Section can be applied.

If an iterative refinement processing is chosen, the approximation used above can be skipped as well. If it is started with the exact criterion, the following term is the result of partial differentiation for $\alpha_\gamma$:

$$\frac{\partial H^+}{\partial \alpha_\gamma} = \frac{-k^2}{2\ln 2}\sum_{i=0}^{N-1} \frac{\frac{\partial |G(i)|^2}{\partial \alpha_\gamma}}{|G(i)|^2 \cdot (\sigma_{X_i}^2 \cdot |G(i)|^2 + k^2)}. \quad (51)$$

For both of the two iterative adaptation rules described above it can—again—not be guaranteed that the global optimum is obtained. Instead, the method converges towards a local optimum, and the final result will strongly depend on the starting solution.

Detailed simulations on actual audio data from the EBU-SQAM CD have demonstrated the expected improvement when applying the inventive processing. There are performance gains of more than 0.2 percent points (16 bit signals assumed) with respect to other prosals.

D) Application to Stereo IntMDCT

In general, a separate optimisation for the left and right channels is applied and, approximately, all rounding error sources can be treated independent from each other if it is assumed for all rounding errors that $\sigma_{N_i}^2 \ll \sigma_{X_i}^2$.

Therefore, the adaptation of noise shaping filters for $n_1$, $n_2$, $n_3$ from TDAC processing, and for $n_4$ from the first stage of the multi-dimensional lifting scheme, is straight-forward and the approximate solution from Section C.1 can be used. For $n_6$, i.e. for the final stage of the multi-dimensional lifting scheme, any noise shaping should not be performed. The question is how to find a solution for the adaptation of $n_5$. This quantisation noise has a two-fold impact: first, it directly adds to X, i.e. to the left channel and, second, its frequency transform adds to Y, i.e. to the right channel. Therefore, a trade-off between no noise shaping and full noise shaping, using the 'normal' approximate adaptation rule, is to be found.

The penalty for the rounding error noise $n_5$ consists of two addends:

$$H_{n_5}^+ = \underbrace{\sum_{i=0}^{N-1}\frac{1}{2}\log_2\left(1+\frac{k^2|G(i)|^2}{\sigma_{Y_i}^2}\right)}_{\text{penalty for Y}} + \quad (52, 53)$$

$$\underbrace{\sum_{i=0}^{N-1}\frac{1}{2}\log_2\left(1+\frac{k^2\left(1+\sum_{\lambda=1}^{p}\alpha_\lambda^2\right)}{\sigma_{X_i}^2}\right)}_{\text{penalty for X}}$$

$$\approx \frac{k^2}{2\ln 2}\left(\sum_{i=0}^{N-1}\frac{|G(i)|^2}{\sigma_{Y_i}^2} + \sum_{i=0}^{N-1}\frac{1+\sum_{\lambda=1}^{p}\alpha_\lambda^2}{\sigma_{X_i}^2}\right).$$

Differentiation for the γ-th coefficient yields:

$$\frac{\partial H_{n_5}^+}{\partial \alpha_\gamma} \approx \qquad (54)$$

$$\frac{k^2}{\ln 2}\left(\sum_{i=0}^{N-1}\frac{\cos(\gamma\Omega_i)}{\sigma_{Y_i}^2} + \sum_{\lambda=1}^{p}\alpha_\lambda\sum_{i=0}^{N-1}\frac{\cos((\gamma-\lambda)\Omega_i)}{\sigma_{Y_i}^2} + \alpha_\gamma\sum_{i=0}^{N-1}\frac{1}{\sigma_{X_i}^2}\right).$$

Setting these terms to zero leads to $$\sum_{\lambda=1}^{p}\alpha_\lambda\sum_{i=0}^{N-1}\frac{\cos((\gamma-\lambda)\Omega_i)}{\sigma_{Y_i}^2} + \alpha_\gamma\sum_{i=0}^{N-1}\frac{1}{\sigma_{X_i}^2} = -\sum_{i=0}^{N-1}\frac{\cos(\gamma\Omega_i)}{\sigma_{Y_i}^2}. \qquad (55)$$

which inspires a modified adaptation rule:

$$M' = \qquad (56)$$

$$\begin{pmatrix} R_y(0)+R_x(0) & R_y(1) & R_y(2) & \cdots & R_y(p-1) \\ R_y(1) & R_y(0)+R_x(0) & R_y(1) & & \\ R_y(2) & R_y(1) & R_y(0)+R_x(0) & & \\ \vdots & & & \ddots & \vdots \\ R_y(p-1) & & & \cdots & R_y(0)+R_x(0) \end{pmatrix}$$

$$= M_y + \mathrm{diag}\, R_x(0).$$

Compared to Section C.1, the only difference is that the main diagonal is modified by adding $R_x(0)$. This kind of processing resembles the white noise correction processing that is sometimes applied in adaptation of linear prediction filters, e.g. in J. D. Markel, A. H. Gray, "Linear Prediction of Speech", Springer-Verlag, Berlin, Heidelberg, New York, 1976.

E) Application of the Invention in Encoding/Decoding

For easier understanding, some prior art details are described in view of the invention.

The known basic principle of lossy based lossless coding is depicted in FIG. 4. In the encoding part on the left side of FIG. 4, a PCM audio input signal $S_{PCM}$ passes through a lossy encoder 81 to a lossy decoder 82 and as a lossy bit stream to a lossy decoder 85 of the decoding part (right side). Lossy encoding and decoding is used to de-correlate the signal. The output signal of decoder 82 is removed from the input signal $S_{PCM}$ in a subtractor 83, and the resulting difference signal passes through a lossless encoder 84 as an extension bit stream to a lossless decoder 87. The output signals of decoders 85 and 87 are combined 86 so as to regain the original signal $S_{PCM}$.

This basic principle is disclosed for audio coding in EP-B-0756386 and U.S. Pat. No. 6,498,811, and is also discussed in P. Craven, M. Gerzon, "Lossless Coding for Audio Discs", J. Audio Eng. Soc., Vol. 44, No. 9, September 1996, and in J. Koller, Th. Sporer, K. H. Brandenburg, "Robust Coding of High Quality Audio Signals", AES 103rd Convention, Preprint 4621, August 1997.

In the lossy encoder the PCM audio input signal $S_{PCM}$ passes through an analysis filter bank and a quantisation for the sub-band samples to a coding processing. The quantisation is controlled by a perceptual model that receives signal $S_{PCM}$ and may receive corresponding information from the analysis filter bank. At decoder side, the encoded lossy bit stream is decoded and the resulting subband samples pass through a synthesis filter bank that outputs the decoded lossy PCM signal. Examples for lossy encoding and decoding are described in detail in the standard ISO/IEC 11172-3 (MPEG-1 Audio).

In the known decomposition of Integer MDCT in FIG. 5, input signals x(k) and y(k) each pass through a TDAC with fixed noise shaping NS and a $DCT_{IV}$ with fixed noise shaping NS, providing the output signals X(i) and Y(i). A stereo version is given as an example, like in the above-mentioned article of R. Geiger et al., Proc. of ICASSP, May 2004. The TDAC is performed per channel in three steps $T^*_1$ to $T^*_3$. The $DCT_{IV}$ is performed using the depicted stages wherein $D^*_1$ to $D^*_3$ are lifting steps (cf. FIG. 2), and P is a permutation and sign inversion for one channel (without rounding operation). Lifting steps are marked by '*' and require rounding operations.

In the prior art, fixed noise shaping is preferably implemented in $T^*_1$, $T^*_2$, $T^*_3$ and $D^*_1$ and optionally $D^*_2$.

According to the invention, adaptive noise shaping is implemented in one or more of the steps/stages $T^*_1$, $T^*_2$, $T^*_3$ and $D^*_1$, and optionally in step/stage $D^*_2$.

FIG. 6 shows a known single multi-dimensional lifting step without noise shaping for an input signal vector x(0), ..., X(N), yielding an output signal vector x(N+1), ..., x(2N).

Based on FIG. 6, FIG. 7 shows a known noise shaping in a single multi-dimensional lifting step. This applies to $T^*_1$, $T^*_2$, $T^*_3$, $D^*_1$ and optionally $D^*_2$ in the IntMDCT algorithm of FIG. 5.

Based on FIG. 5, FIG. 8 shows a stand-alone variant of the inventive adaptive noise shaping IntMDCT. From input signal x(k), filter adaptation parameters or coefficients are calculated in a filter adaptation step or stage 121. The calculated filter parameters or coefficients h(k) are provided to the integer MDCT step or stage 123, which includes a TDAC with adaptive noise shaping filtering and a $DCT_{IV}$ with adaptive noise shaping filtering. The filter adaptation step or stage 121 may also provide corresponding side information 122 for the decoder.

Based on FIG. 8, FIG. 9 shows a stand-alone variant of the inventive adaptive noise shaping inverse IntMDCT. The decoder input signal X(i) passes through an inverse integer MDCT step or stage 133, which includes an inverse TDAC with adaptive noise shaping and an inverse $DCT_{IV}$ with adaptive noise shaping. From its output signal x(k), filter adaptation parameters or coefficients are calculated in a filter adaptation step or stage 131. The calculated filter parameters or coefficients h(k) are provided to step/stage 133. The filter adaptation step or stage 131 may also receive corresponding side information 122 from the encoder. In such case the decoder output signal x(k) may not be required for step/stage 131.

The processing according to FIG. 8 and FIG. 9 is applicable to stand-alone lossless codecs like e.g. MPEG-4 SLS no core.

FIG. 10 shows the block diagram of an inventive scalable-to-lossless transform coder using an adaptive noise shaping IntMDCT, wherein 'scalable-to-lossless' means that the bit stream comprises at least two hierarchical layers: one corresponding to the lossy core codec (e.g. AAC or mp3) and one which—in combination with the first layer—represents the original PCM samples. On one hand, input signal x(k) passes through a transform coder 144 (e.g. an AAC encoder), an optional mapping step or stage 146 and a rounding or quantisation step or stage 147 to a subtractor 140. These steps/ stages are included in lossy encoder 81 in FIG. 4. Transform coder 144 provides encoded signal 148 for the lossy encoder bit stream.

On the other hand, input signal x(k) passes through an integer MDCT 143 to the other input of subtractor 140. For the integer MDCT 143 the inventive adaptive noise shaping is used, i.e. integer MDCT 143 includes a TDAC with adaptive noise shaping filtering and a $DCT_{IV}$ with adaptive noise shaping filtering. Using corresponding information (e.g. quantised transform coefficients, parameters of the quantisers, and possibly original transform coefficients) from coder 144, in a residual estimation step or stage 145 a residual signal (in the time or frequency domain) is estimated that is used to control filter adaptation step or stage 141 as described above. The calculated filter parameters or coefficients h(k) are provided to step/stage 143.

In subtractor 140, the output signal of step/stage 147 is subtracted from the output signal of integer MDCT 143, thereby providing a residuum signal R(i). Signal R(i) is encoded as required, cf. lossless encoder 84 in FIG. 4.

Unlike FIG. 8, the filter adaptation step or stage 141 needs not providing corresponding side information for the decoder because adaptation can be performed at decoder side.

FIG. 11 shows the block diagram of an inventive scalable-to-lossless transform decoder using an adaptive noise shaping inverse IntMDCT. The decoder input signal 158 from the transform encoder bit stream passes through a transform decoder 154 (e.g. an AAC or mp3 decoder), an optional mapping step or stage 156 and a rounding or quantisation step or stage 157 to a combiner 150.

The combiner 150 combines the step/stage 157 output signal with the decoded residuum input signal R(i) from the extension bit stream. The combined signal X(i) passes through an inverse integer MDCT 153 that outputs the lossless decoder output signal x(k), which corresponds to $S_{PCM}$ in FIG. 4. For the inverse integer MDCT 153 the inventive adaptive noise shaping is used, i.e. integer MDCT 143 includes a TDAC with adaptive noise shaping filtering and a $DCT_{IV}$ with adaptive noise shaping filtering. Using corresponding information (e.g. quantised transform coefficients, parameters of the quantisers, and possibly original transform coefficients) from decoder 154, in a residual estimation step or stage 155 a residual signal (in the time or frequency domain) is estimated that is used to control filter adaptation step or stage 151 as described above. The calculated filter parameters or coefficients h(k) are provided to step/stage 153. Unlike FIG. 9, the filter adaptation step or stage 151 needs not receiving corresponding side information for the decoder because the adaptation can be performed at decoder side.

The processing according to FIG. 10 and FIG. 11 is applicable to e.g. MPEG-4 SLS.

FIG. 12 shows the block diagram of a stand-alone variant of the inventive adaptive pre-filter IntMDCT. On one hand, the input signal x(k) is fed to a filter adaptation step or stage 161. The output signal of this step/stage provides the filter parameters or coefficients h(k) for filter characteristic step/stage 168. On the other hand, input signal x(k) passes through a combiner 160 to integer MDCT step or stage 163 (in which no noise shaping is carried out), which provides output signal X'(i) to be encoded for transmission in the bit stream. The output signal of combiner 160 passes through filter characteristic step or stage 168 and quantiser 169 to the other input of combiner 160. Like in FIG. 8, the filter adaptation step or stage 161 may also provide corresponding side information 162 for the decoder.

FIG. 13 shows the block diagram of a stand-alone variant of the inventive adaptive post-filter following the inverse Int-MDCT. The decoder input signal X(i) decoded from the bit stream passes through an inverse integer MDCT step or stage 173, in which no noise shaping is carried out. The output signal of this step/stage is fed to a combiner 170, which provides the output signal x(k). Output signal x(k) is fed to a filter adaptation step or stage 171, which provides the filter parameters or coefficients h(k) for a filter characteristic step/stage 178. The output signal of inverse integer MDCT step or stage 173 passes through filter characteristic step or stage 178 and quantiser 179 to the other input of combiner 170.

The filter adaptation step or stage 171 may also receive corresponding side information 162 from the encoder. In such case the decoder output signal x(k) may not be required for step/stage 171.

The processing according to FIG. 12 and FIG. 13 is applicable to stand-alone lossless codecs like e.g. MPEG-4 SLS no core.

Advantageously, the optimised adaptive noise shaping processing always produces better performance than no noise shaping or the simple low-pass noise shaping processing implemented in the above-mentioned MPEG-4 SLS. According to the invention, an adaptive noise shaping of low order is implemented. Advantageously, then the adaptation of the filter coefficients is straight-forward and the increase of computational complexity is very moderate.

The invention helps to manage and limit the data rate by shaping the rounding error noise spectra.

It will be appreciated that the present invention may comprise a storage medium, for example an optical disc, that contains or stores, or has recorded on it, a digital audio or video signal that is encoded in accordance with the principles discussed herein.

The invention is applicable for lossless coding as far as decomposition into consecutive lifting steps is involved.

A digital audio or video signal that is encoded according to the invention can be stored or recorded on a storage medium, for example an optical disc, a solid-state memory or a hard disc.

The invention claimed is:

1. A method for improving the encoding efficiency for an audio signal, wherein said signal is processed using an integer-reversible transform for each block of samples of said signal, which integer transform is carried out using lifting steps which represent sub-steps of said integer transform and which lifting steps include rounding operations, and wherein noise shaping for the rounding errors resulting from said lifting steps is performed, said method comprising the step:

integer transforming said sample blocks using lifting steps and adaptive noise shaping for at least some of said lifting steps, said transform providing corresponding blocks of transform coefficients and wherein in said noise shaping performs rounding noise from low-level magnitude transform coefficients in a current one of said transformed blocks is decreased whereas rounding noise from high-level magnitude transform coefficients in said current transformed block is increased, and wherein filter coefficients of a corresponding noise shaping filter are derived from said audio signal samples on a frame-by-frame basis, wherein in addition a noise shaping pre-filter is arranged upstream said integer transforming.

2. The method according to claim 1, wherein said filter coefficients of said adaptive noise shaping filter are determined by computing the inverse power spectrum of a signal sample frame, and wherein the filter coefficients are optimized so as to minimize the mean spectral distance between said inverse power spectrum and the frequency response of an all-pole filter corresponding to said filter coefficients.

3. The method according to claim 2, wherein said optimization of said filter coefficients is performed by a linear prediction analysis based on said inverse power spectrum of said signal sample frame.

4. The method according to claim 2, wherein said inverse power spectrum is transformed into pseudo-autocorrelation coefficients before said optimization of said filter coefficients is performed.

5. The method according to claim 2, wherein said optimized filter coefficients are further refined by an iterative gradient descent optimization procedure.

6. The method according to claim 1, wherein said filter coefficients of said noise shaping filter are derived on a frame-by-frame basis from an error or residuum signal available in the encoding processing of said audio or video signal.

7. The method according to claim 1, wherein said noise shaping filter is a recursive or all-pole pre-filter that is not arranged within said integer transform but is arranged upstream said integer transforming.

8. A method for improving the encoding/decoding efficiency for an audio signal, wherein at encoder side said signal was processed using an integer-reversible transform for each block of samples of said signal, which integer transform was carried out using lifting steps which represent sub-steps of said integer transform and which lifting steps include rounding operations, and wherein noise shaping for the rounding errors resulting from said lifting steps was performed, and wherein said sample blocks were integer transformed using lifting steps and adaptive noise shaping for at least some of said lifting steps, said transform providing corresponding blocks of transform coefficients, and wherein in said noise shaping performs rounding noise from low-level magnitude transform coefficients in a current one of said transformed blocks is decreased whereas rounding noise from high-level magnitude transform coefficients in said current transformed block is increased, and wherein filter coefficients of a corresponding noise shaping filter were derived from said audio or video signal samples on a frame-by-frame basis, the decoding of said encoded audio or video signal including the step:
 integer inverse transforming said sample blocks using lifting steps and adaptive noise shaping for at least some of said lifting steps, said inverse transform operating on blocks of transform coefficients and providing corresponding blocks of output sample values and said noise shaping being performed such that rounding noise from low-level magnitude transform coefficients in a current one of said inverse transformed blocks is decreased whereas rounding noise from high-level magnitude transform coefficients in said current inverse transformed block is increased, and wherein filter coefficients of a corresponding noise shaping filter are derived from the inversely transformed audio signal samples on a frame-by-frame basis,
 wherein in addition a noise shaping post-filter is arranged downstream said inverse integer transforming.

9. The method according to claim 8, wherein said filter coefficients of said adaptive noise shaping filter are determined by computing the inverse power spectrum of a signal sample frame, and wherein the filter coefficients are optimized so as to minimize the mean spectral distance between said inverse power spectrum and the frequency response of an all-pole filter corresponding to said filter coefficients.

10. The method according to claim 9, wherein said optimization of said filter coefficients is performed by a linear prediction analysis based on said inverse power spectrum of said signal sample frame.

11. The method according to claim 9, wherein said inverse power spectrum is transformed into pseudo-autocorrelation coefficients before said optimization of said filter coefficients is performed.

12. The method according to claim 9, wherein said optimized filter coefficients are further refined by an iterative gradient descent optimization procedure.

13. The method according to claim 8, wherein said filter coefficients of said noise shaping filter are derived on a frame-by-frame basis from an error or residuum signal available in the decoding processing of said audio or video signal.

14. The method according to claim 8, wherein said noise shaping filter is a post-filter that is not arranged within said inverse integer transform but is arranged downstream said inverse integer transforming.

15. An apparatus for improving the encoding efficiency for an audio signal, wherein said signal is processed using an integer-reversible transform for each block of samples of said signal, which integer transform is carried out using lifting steps which represent sub-steps of said integer transform and which lifting steps include rounding operations, and wherein noise shaping for the rounding errors resulting from said lilting steps is performed, said apparatus including:
 means being adapted for integer transforming said sample blocks using lifting steps and adaptive noise shaping for at least some of said lifting steps, said transform providing corresponding blocks of transform coefficients, and wherein in said noise shaping performs rounding noise from low-level magnitude transform coefficients in a current one of said transformed blocks is decreased whereas rounding noise from highlevel magnitude transform coefficients in said current transformed block is increased;
 a corresponding noise shaping filter, the filter coefficients of which are derived from said audio signal samples on a frame-by-frame basis,
 wherein in addition a noise shaping pre-filter is arranged upstream said integer transforming.

16. The apparatus according to claim 15, wherein said filter coefficients of said adaptive noise shaping filter are determined by computing the inverse power spectrum of a signal sample frame, and wherein the filter coefficients are optimized so as to minimize the mean spectral distance between said inverse power spectrum and the frequency response of an all-pole filter corresponding to said filter coefficients.

17. The apparatus according to claim 15, wherein said optimization of said filter coefficients is performed by a linear prediction analysis based on said inverse power spectrum of said signal sample frame.

18. The apparatus according to claim 15, wherein said inverse power spectrum is transformed into pseudo-autocorrelation coefficients before said optimization of said filter coefficients is performed.

19. The apparatus according to claim 15, wherein said optimized filter coefficients are further refined by an iterative gradient descent optimization procedure.

20. The apparatus according to claim 15, wherein said filter coefficients of said noise shaping filter are derived on a frame-by-frame basis from an error or residuum signal available in the encoding processing of said audio or video signal.

21. The apparatus according to claim 15, wherein said noise shaping filter is a recursive or all-pole pre-filter that is not arranged within said integer transform but is arranged upstream said integer transforming.

22. An apparatus for improving the encoding/decoding efficiency for an audio signal, wherein at encoder side said signal was processed using an integer-reversible transform for each block of samples of said signal, which integer transform was carried out using lilting steps which represent substeps of said integer transform and which lifting steps include rounding operations, and wherein noise shaping for the rounding errors resulting from said lilting steps was performed, and wherein said sample blocks were integer transformed using lifting steps and adaptive noise shaping for at least some of said lifting steps, said transform providing corresponding blocks of transform coefficients, and wherein in said noise shaping performs rounding noise from low-level magnitude transform coefficients in a current one of said transformed blocks is decreased whereas rounding noise from high-level magnitude transform coefficients in said current transformed block is increased, and wherein filter coefficients of a corresponding noise shaping filter were derived from said audio signal samples on a frame-by-frame basis, the apparatus being suited for decoding said encoded audio signal, and including:

means being adapted for integer inverse transforming said sample blocks using lifting steps and adaptive noise shaping for at least some of said lifting steps, said inverse transform operating on blocks of transform coefficients and providing corresponding blocks of output sample values and said noise shaping being performed such that rounding noise from low-level magnitude transform coefficients in a current one of said inverse transformed blocks is decreased whereas rounding noise from high-level magnitude transform coefficients in said current inverse transformed block is increased;

a corresponding noise shaping filter, the filter coefficients of which are derived from the inversely transformed audio signal samples on a frame-by-frame basis, wherein in addition a noise shaping post-filter is arranged downstream said inverse integer transforming.

23. The apparatus according to claim 22, wherein said filter coefficients of said adaptive noise shaping filter are determined by computing the inverse power spectrum of a signal sample frame, and wherein the filter coefficients are optimized so as to minimize the mean spectral distance between said inverse power spectrum and the frequency response of an all-pole filter corresponding to said filter coefficients.

24. The apparatus according to claim 23, wherein said optimization of said filter coefficients is performed by a linear prediction analysis based on said inverse power spectrum of said signal sample frame.

25. The apparatus according to claim 23, wherein said inverse power spectrum is transformed into pseudo-autocorrelation coefficients before said optimization of said filter coefficients is performed.

26. The apparatus according to claim 23, wherein said optimized filter coefficients are further refined by an iterative gradient descent optimization procedure.

27. The apparatus according to claims 22, wherein said filter coefficients of said noise shaping filter are derived on a frame-by-frame basis from an error or residuum signal available in the decoding processing of said audio or video signal.

28. The apparatus according to claim 22, wherein said noise shaping filter is a post-filter that is not arranged within said inverse integer transform but is arranged downstream said inverse integer transforming.

29. A non-transitory storage medium, that contains or stores, or has recorded on it, a digital audio or video signal that is encoded according to claim 1.

\* \* \* \* \*